United States Patent [19]

Conrad

[11] 4,390,086
[45] Jun. 28, 1983

[54] AUTOMATIC ADJUSTERS FOR DRUM BRAKES

[75] Inventor: Willibrod Conrad, Octendunig, Fed. Rep. of Germany

[73] Assignee: Lucas Industries Limited, Birmingham, England

[21] Appl. No.: 151,298

[22] Filed: May 19, 1980

[30] Foreign Application Priority Data

May 21, 1979 [GB] United Kingdom ............... 7917628

[51] Int. Cl.³ ............................................ F16D 65/40
[52] U.S. Cl. ........................... 188/79.5 B; 192/111 A
[58] Field of Search ..................... 188/79.5 B, 79.5 P; 192/111 A, 111 R

[56] References Cited

U.S. PATENT DOCUMENTS

| | | | |
|---|---|---|---|
| 2,292,017 | 8/1942 | Smith | 188/79.5 B |
| 2,818,143 | 12/1957 | Phillips | 188/79.5 B |
| 3,384,204 | 5/1968 | Swift | 188/79.5 B X |
| 3,429,412 | 2/1969 | Wobrock | 192/111 A |
| 4,243,124 | 1/1981 | Kluger | 188/79.5 P |
| 4,270,632 | 6/1981 | Langert | 188/79.5 P |

FOREIGN PATENT DOCUMENTS 1507550  4/1978  United Kingdom ........... 188/79.5 B

*Primary Examiner*—George E. A. Halvosa
*Attorney, Agent, or Firm*—Scrivener, Clarke, Scrivener and Johnson

[57] ABSTRACT

A vehicle drum brake comprises an automatic adjuster with thermal compensation, so that the brake does not become over-adjusted following thermal expansion and subsequent contraction of the drum. The adjuster overcomes the problems associated with adjusters which at high temperatures are disabled, and so might leave the brake under-adjusted. The adjuster comprises a bimetallic strip or equivalent incorporated into the adjuster strut to expand the strut when the drum expands, and to contract the strut when the drum contracts. Thus the adjuster takes up excess slack due to lining wear, but not that due to drum expansion. The adjuster is suited for use on those drum brake adjusters where the strut is lengthened by operation of the service brake actuator, and not of the handbrake actuator.

6 Claims, 3 Drawing Figures

AUTOMATIC ADJUSTERS FOR DRUM BRAKES

This invention relates to automatically adjustable shoe drum brakes.

Typically, such brakes have adjusters incorporating a strut which separates the brake shoes, the shoes being urged against the strut after a brake application by shoe-return springs. The strut is of automatically variable length, the aim being to maintain a running clearance between the shoes and the drum which is neither too small nor too large.

When a vehicle descends a long hill, and the brake is repeatedly applied, the drum becomes hot and expands. The adjuster cannot normally sense the difference between drum expansion and lining wear, so that the adjuster responds to drum expansion, and the length of the strut is increased. It can happen that the strut has increased its length so much that, when the drum later cools, the shoes do not retract at all from the drum, so that the brake is locked on. If sufficient running clearance is left to ensure that this can never happen, then the clearance or "slack" required during normal-temperaure operation of the brake is inconveniently high for the brake actuation system.

It has previously been proposed to incorporate bimetallic strips into the adjuster, which bend when hot to deflect one part of the adjuster out of engagement with another to render the adjuster inoperative at high temperatures. However, the friction linings tend to wear most rapidly when the drum is hot, so that disabling the adjuster at that time, whilst alleviating the problem of over-adjustment, can leave the brake under-adjusted.

The invention is aimed at providing an adjuster which ignores drum expansion, yet which is responsive to lining wear.

In accordance with the invention, there is provided an automatically adjustable shoe drum brake having a hydraulically operable actuator, a mechanical actuator, and an adjuster having an adjustable length strut extending between opposed brake shoes, the length of the strut being increased automatically as the separation of the shoes increases due to wear, the arrangement of the strut being such that brake application forces caused by operation only of the hydraulically operable actuator are not transmitted to the shoes through the sturt, wherein the adjuster includes a thermally responsive element which serves to vary the length of the strut in response to changes in temperature of the element.

The element can take the form of, for example, a bellows, but preferably takes the form of a bimetallic strip, which is inserted into the strut at an effective point, as described below. Preferably, such a strip is formed with a hole, so that it can be slipped over a part of the strut, and by which it is held in position on the strut.

A shoe drum brake in accordance with the invention will now be described, by way of example, with reference to the accompanying drawings, in which.

Figure 1:
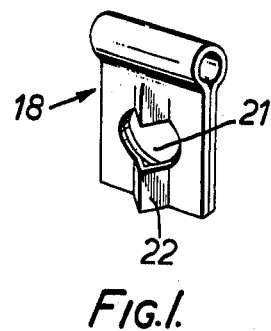
FIG. 1 is a pictorial view of a thermally responsive element incorporated in the brake.

The drum brake comprises shoes 1, 2 which are urged apart into contact with a drum (not shown) either by a hydraulic actuator 3 or by a (leftwards) force on the handbrake lever 4 which is pivoted to the shoe 2 at the pivot pin 5.

The handbrake lever force is transmitted to the left shoe 1 through the strut 6. The sturt 6 comprises a threaded rod 7, a nut 8 having ratchet teeth on an external cylindrical surface, and a barrel 9, and the free end of the rod 7 extends into the hollow interior of the barrel.

Figure 3:
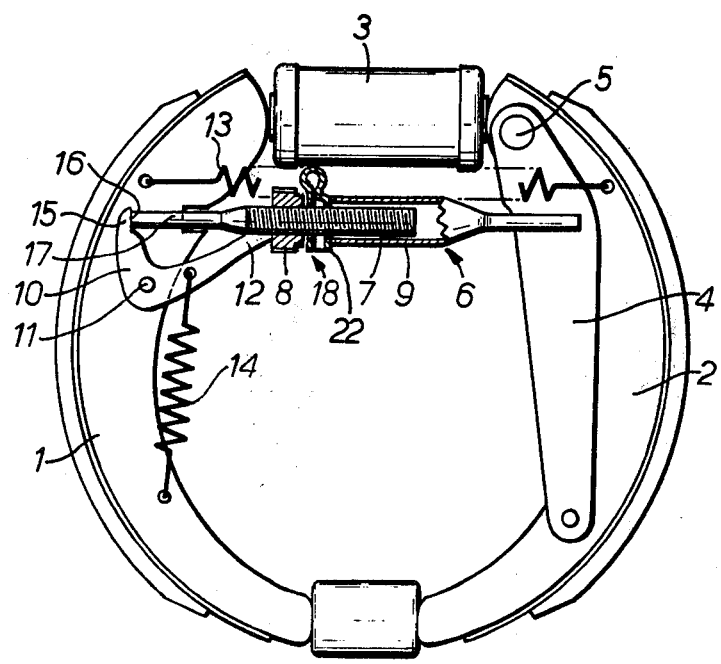
FIG. 3 is a part sectioned elevation, on a reduced scale, of the brake which incorporates the element of FIG. 1.

A pawl lever 10 is pivoted at a pivot pin 11 to the left shoe 1, and one arm 12 carries a pawl (hidden in FIG. 3) which engages the ratchet teeth of the nut 8. A shoe return spring 13 urges the shoes together, into contact with the strut, to subject the strut to a (small) compressive force. A pawl spring 14 urges the lever 10 clockwise, so that the other arm 15 of the lever 10 abuts the end 16 of the rod 7. The shoe return spring 13 has a stronger effect than the pawl spring 14 so that the shoe 1 engages firmly into the bottom 17 of the slotted end of the rod 7, whilst the lever arm 15 abuts the end 16.

When the brake is applied by means of the hydraulic actuator 3, the shoes separate, so that a gap opens between the shoe 1 and the bottom 17 of the slot: the strut 6 moves to the right under the influence of the spring 14 which is urging the lever 10 clockwise. The arm 12 of the lever moves downwards, and the pawl at the end of that arm acts upon the ratchet teeth of the nut 8. If the pawl movement is excessive, the nut 8 is rotated, thus lengthening the strut 6, until the running clearance is reduced to the required value.

Figure 2:
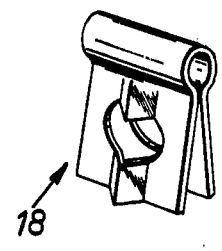
FIG. 2 is a view of the element of FIG. 1, when hot.

If the drum expands, the shoes must separate further to apply the brake, and consequently the pawl would tend to screw the nut 8 along the rod 7 to compensate for this extra travel, as if it were lining wear. However, incorporated into the strut 6, between the barrel 9 and the nut 8, is the thermally responsive element 18. The element comprises a bimetallic strip, bent and shaped as shown in FIG. 2. With the shape shown, the metal with the high expansion rate is arranged on the inside of the bend. The element is formed with a through-hole 21, dimensioned so that the element can be slipped over the threaded rod 7. The element is also formed with a rib 22, of triangular form, which fits into a complementary groove in the end of the barrel 9, to locate the element against rotation.

At normal temperatures the strip lies flat, as in FIG. 1, and the strut behaves as if the strip were a solid extension of the barrel 9. At elevated temperatures however, the strip tends to bend, as shown in FIG. 2, and thus to increase the length of the strut 6. If the brake at that time is being applied by the actuator 3, then the actuator 3 expands the return spring 13, and so the strut is now only being compressed by the action of the pawl spring 14. The bending of the strip provides sufficient strut-lengthening force to overcome the relatively small effect of the spring and so lengthens the strut when the brake is hot. By careful design, it is possible to arrange for the shoes exactly to follow the drum expansion though this degree of accuracy is not essential in practical drum brakes. Thus, repeated hydraulic applications of the brake, with the drum hot, would cause a conventional strut, i.e. one without a thermally responsive element, to be lengthened by the adjuster, enough perhaps to lock the shoes to the drum when the drum latter contracts. With the element incorporated, the strut lengthens without adjustment as the drum expands, so that repeated hydraulic applications have no effect on the adjuster. The strut shortens again later as the drum contracts.

If the handbrake is applied whilst the actuator 3 is also applied, a heavy force is transmitted through the strut 6, so that a heated, and bent, strip collapses to the shape shown in FIG. 1. In the brake shown, the adjuster does not respond to excess travel of the handlever, so this collapse does not matter. If the element were so constructed that it could support the return spring load without collapsing, or even if it could support the full brake application force, then the thermal compensation would still take place. The element only needs to overcome the pawl spring force however, to be effective.

Whilst the element 18 is generally suitable for use on most kinds of drum brake adjuster, it is not suitable for the kind of adjuster which adjusts for excess shoe travel whilst the strut is transmitting a large force, normally a brake actuating force, applied either by jacking a nut along the strut, or, as is more usual, by storing in a spring energy corresponding to excess shoe travel, the energy being released later to turn a nut when the actuating force applied to the strut is reduced. The compensating effects of the expansion of the described element would be lost if the adjuster responded to a signal to adjust the length of the strut when the element were at that time squashed flat, due to high compressive forces.

I claim:

1. An automatically adjustable internal shoe drum brake having a brake drum, at least one brake shoe, a hydraulic actuator for moving the at least one brake shoe outwardly into engagement with the brake drum, a mechanical actuator operable independently of the hydraulic actuator to move the at least one brake shoe outwardly into engagement with the brake drum, spring means biasing the at least one brake shoe inwardly away from the brake drum, a strut for limiting inward movement of the at least one brake shoe under the influence of the spring means, the strut comprising first and second telescopically arranged parts having opposing abutment surfaces, a bimetallic element having an aperture through which at least one of said parts of the strut passes and having first and second abutment surfaces which engage the first and second abutment surfaces of the strut respectively, the bimetallic element being effective upon being subjected to an elevated temperature to move the abutment surfaces of the strut away from each other to increase the length of the strut, and an adjuster automatically operable as the at least one brake shoe wears to increase the effective length of the strut.

2. A brake according to claim 1, wherein the strut comprises a first, screw-threaded portion on which is screwed a complementary screw threaded nut having ratchet teeth on the circumference thereof, and a second portion, the element being located between and engaging the nut and the second portion.

3. A brake according to claim 2, wherein the element has locating means for locating it to prevent rotational movement of the element.

4. A brake according to claim 3, wherein the locating means comprises a projection formed on the element which engages in a recess formed in the strut.

5. A brake according to claim 4, wherein the recess is formed in the second portion of the strut.

6. A brake according to any of claims 2 to 4 and 1, wherein the element has two generally parallel arms joined by an interconnecting portion, said arms being arranged to separate to increase the length of the strut.

* * * * *